United States Patent
Tuxen

(10) Patent No.: US 9,645,235 B2
(45) Date of Patent: *May 9, 2017

(54) DETERMINATION OF SPIN PARAMETERS OF A SPORTS BALL

(71) Applicant: TRACKMAN A/S, Vedbæk (DK)

(72) Inventor: Fredrik Tuxen, Hørsholm (DK)

(73) Assignee: TRACKMAN A/S, Vedbaek (DK)

( * ) Notice: Subject to any disclaimer, the term of this patent is extended or adjusted under 35 U.S.C. 154(b) by 139 days.

This patent is subject to a terminal disclaimer.

(21) Appl. No.: 14/478,666

(22) Filed: Sep. 5, 2014

(65) Prior Publication Data
US 2016/0067581 A1    Mar. 10, 2016

Related U.S. Application Data

(63) Continuation of application No. 11/885,280, filed as application No. PCT/DK2006/000117 on Feb. 28, 2006, now Pat. No. 8,845,442.

(60) Provisional application No. 60/657,704, filed on Mar. 3, 2005.

(51) Int. Cl.
| | |
|---|---|
| *A63B 69/36* | (2006.01) |
| *A63B 57/00* | (2015.01) |
| *G01P 3/00* | (2006.01) |
| *A63B 24/00* | (2006.01) |

(Continued)

(52) U.S. Cl.
CPC .............. *G01S 13/58* (2013.01); *G01S 13/88* (2013.01); *A63B 24/0021* (2013.01); *A63B 69/3658* (2013.01); *A63B 2024/0034* (2013.01); *A63B 2220/35* (2013.01)

(58) Field of Classification Search
CPC ........ A63B 24/0021; A63B 2024/0034; A63B 69/3658; A63B 2220/35

USPC .................. 356/4.01, 5.09, 16–17, 27–28.5; 273/317.2, 108.2; 473/152, 198–200, 473/405; 702/145–148
See application file for complete search history.

(56) References Cited

U.S. PATENT DOCUMENTS

| | | | |
|---|---|---|---|
| 3,264,643 | A | 8/1966 | Nilssen |
| 3,324,468 | A | 6/1967 | Knepper |
| 3,777,665 | A | 12/1973 | Ziemba |

(Continued)

FOREIGN PATENT DOCUMENTS

| | | |
|---|---|---|
| DE | 26 20 991 | 3/1977 |
| EP | 0 116 183 | 8/1984 |

(Continued)

OTHER PUBLICATIONS

"Trackman System Used to Track Tiger Wood's ball at US Open," Jul. 15, 2008, Retrieved from the Internet: URL: http://www.youtube.com/watch?v=0esAOPRZaVg [retrieved on Mar. 29, 2011].

(Continued)

*Primary Examiner* — Mark Graham
(74) *Attorney, Agent, or Firm* — Fay Kaplun & Marcin, LLP

(57) ABSTRACT

A method of determining spin parameters of a sports ball, such as spin axis and rotation velocity of a golf ball. The spin axis is determined solely from the trajectory of the flying ball, and the rotational velocity is determined from a frequency analysis of a signal provided by a radar, which signal comprises spectrum traces positioned equidistantly in frequency, which frequency distance relates to the spin velocity.

27 Claims, 10 Drawing Sheets

(51) Int. Cl.
*G01S 13/58* (2006.01)
*G01S 13/88* (2006.01)

(56) References Cited

U.S. PATENT DOCUMENTS

| | | | |
|---|---|---|---|
| 3,798,644 A | 3/1974 | Constant |
| 3,798,795 A | 3/1974 | Michelsen |
| 3,856,237 A | 12/1974 | Torian et al. |
| 3,974,740 A | 8/1976 | Billottet et al. |
| 3,981,010 A | 9/1976 | Michelsen |
| 3,992,708 A | 11/1976 | Olson et al. |
| 4,015,258 A | 3/1977 | Smith et al. |
| 4,509,052 A | 4/1985 | Cash |
| 4,545,576 A | 10/1985 | Harris |
| 4,563,005 A | 1/1986 | Hand et al. |
| 4,622,554 A | 11/1986 | Gellekink et al. |
| 4,713,686 A | 12/1987 | Ozaki et al. |
| 4,751,511 A | 6/1988 | Komata et al. |
| 5,056,791 A | 10/1991 | Poillon et al. |
| 5,092,602 A | 3/1992 | Witler et al. |
| 5,138,322 A | 8/1992 | Nuttall |
| 5,150,895 A | 9/1992 | Berger |
| 5,241,317 A | 8/1993 | Howard |
| 5,246,232 A | 9/1993 | Eccher et al. |
| 5,290,037 A | 3/1994 | Witler et al. |
| 5,319,373 A | 6/1994 | Maxwell et al. |
| 5,342,051 A | 8/1994 | Rankin et al. |
| 5,357,255 A | 10/1994 | Giraudy |
| 5,375,832 A | 12/1994 | Witler et al. |
| 5,401,026 A | 3/1995 | Eccher |
| 5,406,290 A | 4/1995 | James et al. |
| 5,413,345 A | 5/1995 | Nauck |
| 5,486,002 A | 1/1996 | Witler et al. |
| 5,489,099 A | 2/1996 | Rankin et al. |
| 5,495,249 A | 2/1996 | Chazelle et al. |
| 5,609,534 A | 3/1997 | Gebhardt et al. |
| 5,631,654 A | 5/1997 | Karr |
| 5,700,204 A | 12/1997 | Teder |
| 5,781,505 A | 7/1998 | Rowland |
| 5,796,474 A | 8/1998 | Squire et al. |
| 5,803,823 A | 9/1998 | Gobush et al. |
| 5,846,139 A | 12/1998 | Bair et al. |
| 5,868,578 A | 2/1999 | Baum |
| 5,873,040 A | 2/1999 | Dunn et al. |
| 5,879,246 A | 3/1999 | Gebhardt et al. |
| 5,952,957 A | 9/1999 | Szu |
| 6,042,492 A | 3/2000 | Baum |
| 6,057,915 A | 5/2000 | Squire et al. |
| 6,067,039 A | 5/2000 | Pyner et al. |
| 6,133,946 A | 10/2000 | Cavallaro et al. |
| 6,179,720 B1 | 1/2001 | Rankin et al. |
| 6,198,501 B1 | 3/2001 | Nemiroff et al. |
| 6,244,971 B1 | 6/2001 | Mihran |
| 6,266,005 B1 | 7/2001 | Schneider |
| 6,292,130 B1 | 9/2001 | Cavallaro et al. |
| 6,304,665 B1 | 10/2001 | Cavallaro et al. |
| 6,320,173 B1 | 11/2001 | Vock et al. |
| 6,371,862 B1 | 4/2002 | Reda |
| 6,400,306 B1 | 6/2002 | Nohara et al. |
| 6,450,442 B1 | 9/2002 | Schneider et al. |
| 6,456,232 B1 | 9/2002 | Milnes et al. |
| 6,520,864 B1 | 2/2003 | Wilk |
| 6,547,671 B1 | 4/2003 | Mihran |
| 6,592,465 B2 | 7/2003 | Lutz |
| 6,621,561 B2 | 9/2003 | Holton |
| 6,764,412 B2 | 7/2004 | Gobush et al. |
| 6,791,217 B2 | 9/2004 | Collier-Hallman et al. |
| 6,956,523 B2 | 10/2005 | Mohan |
| 7,031,873 B2 | 4/2006 | Song |
| 7,133,801 B2 | 11/2006 | Song |
| 7,161,733 B2 | 1/2007 | Fukata et al. |
| 7,321,330 B2 | 1/2008 | Sajima |
| 8,085,188 B2 | 12/2011 | Tuxen |
| 8,845,442 B2 * | 9/2014 | Tuxen ............ A63B 24/0021 273/108.2 |
| 2002/0075475 A1 | 6/2002 | Holton |
| 2002/0107078 A1 | 8/2002 | Collins |
| 2002/0114493 A1 | 8/2002 | McNitt et al. |
| 2003/0076255 A1 | 4/2003 | Ono |
| 2003/0103684 A1 | 6/2003 | Gobush et al. |
| 2004/0032970 A1 | 2/2004 | Kiraly |
| 2004/0248662 A1 | 12/2004 | Gobush et al. |
| 2005/0030222 A1 | 2/2005 | Steudel |
| 2005/0030333 A1 | 2/2005 | Takahashi et al. |
| 2006/0092075 A1 | 5/2006 | Bruce et al. |
| 2007/0167247 A1 | 7/2007 | Lindsay |
| 2009/0295624 A1 | 12/2009 | Tuxen |

FOREIGN PATENT DOCUMENTS

| | | |
|---|---|---|
| EP | 0529489 | 3/1993 |
| EP | 1 158 270 | 11/2001 |
| GB | 2 283 144 A | 4/1995 |
| GB | 2 294 403 | 5/1996 |
| GB | 2319834 | 6/1998 |
| GB | 2380682 | 4/2003 |
| JP | 59-137873 | 8/1984 |
| JP | 06-126015 | 5/1994 |
| JP | 08/266701 | 10/1996 |
| JP | 2001-74837 A | 3/2001 |
| JP | 2003-098255 | 4/2003 |
| JP | 2003-294777 A | 10/2003 |
| WO | 90/08936 A1 | 8/1990 |
| WO | 91/06348 | 5/1991 |
| WO | 93/04382 A1 | 3/1993 |
| WO | 99/27384 | 6/1999 |
| WO | 00/62090 A1 | 10/2000 |
| WO | 02/25303 | 3/2002 |
| WO | 03/005281 | 1/2003 |
| WO | 03/032006 | 4/2003 |
| WO | 2004/031680 A1 | 4/2004 |
| WO | 2005/017553 | 2/2005 |
| WO | 2005/081014 | 9/2005 |
| WO | 2005/116678 A2 | 12/2005 |
| WO | 2006/002639 A1 | 1/2006 |
| WO | 2006/002640 A1 | 1/2006 |

OTHER PUBLICATIONS

US Office Action dated May 28, 2013, issued in U.S. Appl. No. 13/138,167.
US Office Action dated Oct. 16, 2013, issued in U.S. Appl. No. 13/138,167.
US Office Action dated Apr. 24, 2012, issued in U.S. Appl. No. 13/303,889.
US Office Action dated Oct. 8, 2013, issued in U.S. Appl. No. 13/303,889.
US Office Action dated Mar. 31, 2014, issued in U.S. Appl. No. 13/138,167.
Lolck, Jens-Erik. "TERMA Elektronik AS: Doppler Radar Spin Measurement," Brochure (1986).
"DR 5000 User's Guide: DR 5000 Spin Calculation," pp. 27-45 and 48-59 (2004).
International Search Report for related International Application No. PCT/DK2005/000457.
International Search Report for related International Application No. PCT/DK2005/000456.
International Search Report for related International Application No. PCT/DK2005/000336.
International Search Report for corresponding International Application No. PCT/DK2006/000117.
International Search Report for related International Application No. PCT/DK2004/000918.
Bosse et al., "Improved radar tracking using a multipath model: maximum likelihood compared with eigenvector analysis," IEEE Proc. Radar, Sonar Navig., vol. 141, No. 4, pp. 213-222 (Aug. 1994).
U.S. Notice of Allowance dated Jul. 18, 2014, issued in U.S. Appl. No. 11/885,280.

(56) References Cited

OTHER PUBLICATIONS

U.S. Notice of Allowance dated Jul. 14, 2014, issued in U.S. Appl. No. 13/303,889.
Zhang Ruoyo et al., "Radar Reflected Signal Process of High Spinning Rate Projectiles," The Eighth International Conference on Electronic Measurement and Instruments, 2007, pp. 3-982-985.
Ye Wei et al., "A New Method for Spin Estimation Using the Data of Doppler Radar," Proceedings ofICSP, 2000, pp. 1911-1914.
Katsuhiko Masuda et al., "Measurement of Initial Conditions of a Flying Golf Ball," WEAM 4-4, 1994, pp. 344-347.
John K. Christensen et al., "Doppler-Surface Mapping Technique for Characterisation of Spinning CylindeJ:s Illuminated by Radar," A&E Systems Magazine, Aug. 2005, pp. 19-24.
Soon-Huat Ong et al., "Signal-Adapted Wavelets for Doppler Radar System," Seventh Annual Conference on Control, Dec. 2002, pp. 19-23.
"Technology." Zelocity, Go\fPerformance Monitors.—http://www.zelocity.com/golf/techno\ogy.shtml. Copyright 2004-2006. Retrieved Jun. 9, 2010.
"3D Doppler Ball Traking Monitors, Golf Radars and Launch Monitors." Flightscopehttp://www.flightscope.com/index.php/About-Us/about-us.html. Copyright 2009. Retrieved Jun. 9, 2010.

* cited by examiner

DETERMINATION OF SPIN PARAMETERS OF A SPORTS BALL

CROSS-REFERENCE TO RELATED APPLICATIONS

This application is a continuation of U.S. application Ser. No. 11/855,280, filed Sep. 30, 2008, which is a National Phase entry of PCT Application No. PCT/DK2006/000117, filed on Feb. 28, 2006, which claims priority under 35 to U.S.C. §119(e), to U.S. Provisional Application No. 60/657,704, filed on Mar. 3, 2005, in the U.S. Patent and Trademark Office.

The present invention relates to the determination of spin parameters of a sports ball while in flight, and in particular to the determination of the spin axis and/or a rotational velocity of the sports ball.

Such parameters are highly interesting both for using and developing sports balls and other sports equipment, such as golf clubs, irons, rackets, bats or the like used for launching sports balls.

For golf balls, such determinations normally have been made by adding to the golf balls strips or patterns of a radar reflecting material. This, however, can only be made for test purposes in that this type of ball is highly standardized. Technologies of this type may be seen in U.S. Pat. No. 6,244,971 and US 2002/0107078.

The present invention aims at being able to perform these determinations without altering the sports balls.

In a first aspect, the invention relates to a method of estimating a spin axis of a sports ball while in flight, the method comprising:
1. determining at least part of a 3D-trajectory of the flying sports ball,
2. estimating, from the trajectory, an acceleration, preferably a total acceleration, of the sports ball at a predetermined position along the trajectory,
3. estimating an acceleration of the sports ball caused by gravity at the predetermined position,
4. estimating an acceleration of the sports ball caused by air resistance/drag at the predetermined position, and
5. estimating the spin axis, at the predetermined position, on the basis of the estimated accelerations.

In general, it may be argued that for a rotationally symmetric sports ball in flight, only three forces act: the gravity, the air resistance or drag and the so-called lift of the ball caused by any spin thereof. Thus, estimating the individual accelerations will bring about information facilitating the determination of the lift or the direction thereof caused by a rotation of the ball. Thus, the deviation from a trajectory positioned in a single, vertical plane in which the acceleration is caused by gravity and drag, may be caused by the spin. However, a lift and a spin may also act within this vertical plane.

It should be noted that knowledge is only required at a small area around the predetermined position in that only the overall acceleration thereof is to be determined. This may e.g. be determined from two points along the trajectory, where position and velocity is known.

Preferably, the determination of the spin axis is performed at a number of positions along the trajectory of the ball. Thus, preferably, at least steps 2-4 are preformed at each of a plurality of points in time. Then, the step 5 may be performed once on the basis of the accelerations determined at a plurality of points in time (such as from an average thereof) or may be determined for each of the points in time in order to determine a time variation of the spin axis.

Also, it is clear that the trajectory information may be derived in any suitable manner, such as the use of a RADAR, 3D imaging equipment, or the like. Naturally, the trajectory may be represented as the coordinates of the ball at one or more points in time. The coordinate system may be chosen in any manner.

Preferably, step 5. comprises subtracting the accelerations estimated in steps 3. and 4. from that estimated in step 2, determining a residual acceleration, and estimating the spin axis on the basis of a direction of the residual acceleration. Thus, the spin axis may be determined using simple vector calculus.

In this situation, the spin axis of the ball will be perpendicular to the direction of the residual acceleration in that the spin of the ball will act to turn the direction of the ball.

Also, step 4 may comprise estimating a velocity of the ball at the predetermined position from the trajectory and estimating the acceleration on the basis of the estimated velocity or rather a deviation in velocity between two points on the trajectory.

Another aspect of the invention relates to a system for estimating a spin axis of a sports ball while in flight, the system comprising:
1. means for determining at least part of a 3D-trajectory of the flying sports ball,
2. means for estimating, from the trajectory, an acceleration, preferably a total acceleration, of the sports ball at a predetermined position along the trajectory,
3. means for estimating an acceleration of the sports ball caused by gravity at the predetermined position,
4. means for estimating an acceleration of the sports ball caused by air resistance/drag at the predetermined position, and
5. means for estimating the spin axis, at the predetermined position, on the basis of the estimated accelerations.

Again, the means 2-4 may be adapted to perform the estimations at each of a plurality of predetermined positions, and the means 5. are preferably adapted to subtract the accelerations estimated in steps 3. and 4. from that estimated in step 2, determine a residual acceleration, and estimate the spin axis on the basis of a direction of the residual acceleration, in order to e.g. facilitate an easy determination of the axis. When the accelerations have been estimated at a plurality of positions, the spin axis may be determined (means 5) once for all these positions or for each position.

Also, the means 4 may be adapted to estimate a velocity of the ball at the predetermined position from the trajectory and estimate the acceleration on the basis of the estimated velocity.

A third aspect of the invention relates to a method of estimating a rotational velocity or spin frequency of a rotating sports ball in flight, the method comprising:
1. a number of points in time during the flight, receiving electromagnetic waves reflected from the rotating sports ball and providing a corresponding signal,
2. performing a frequency analysis of the signal, and identifying one, two or more discrete spectrum traces positioned at least substantially equidistantly in frequency and being continuous over time, and
3. estimating the velocity/frequency from a frequency distance between the discrete spectrum traces.

In the present context, any type of electromagnetic wave may be used, such as visible radiation, infrared radiation, ultrasound, radio waves, etc.

In addition, any number of points in time may be used. It may be preferred to receive the radiation as long as a meaningful detection is possible or as long as the spectrum traces may be determined in the signal. Normally, the reception and subsequent signal analysis is performed at equidistant points in time.

In order to ensure that the distance between the spectrum traces is correctly determined, preferably more than 2 equidistant spectrum traces are identified.

Naturally, the frequency analysis may result in a spectrum of the signal. This, however, is not required in that only the equidistant spectrum traces are required.

In this context, a spectrum trace is a sequence of frequencies which is at least substantially continuous in time but which may vary over time. In the present context, a trace normally is a slowly decaying function, but any shape is in principle acceptable and determinable.

Preferably, step 1. comprises receiving the reflected electromagnetic waves using a receiver, and wherein step 2. comprises identifying, subsequent to the frequency analysis, a first frequency corresponding to a velocity of the ball in a direction toward or away from the receiver and wherein identification of the spectrum traces comprises identifying spectrum traces positioned symmetrically around the first frequency.

In this manner, another frequency is determined which may aid in ensuring that the equidistant spectrum lines are correctly determined. In addition, requiring also the symmetry around this frequency further adds to ensuring a stable determination.

In a preferred embodiment, step 2. comprises, for each point in time and sequentially in time:
  performing the frequency analysis and an identification of equidistant candidate frequencies for a point in time,
  subsequently identifying those candidates which each has a frequency deviating at the most a predetermined amount from a frequency of a candidate of one or more previous points in time,
  then identifying, as the frequency traces, traces of identified candidates,
and where step 3 comprises estimating the velocity/frequency on the basis of the identified spectrum traces.

This has the advantage that the determination may be made sequentially, such as in parallel with the receipt of the reflected radiation. Also, a noise cancellation is performed in that what might resemble valid equidistant spectrum lines in one measurement may not have any counterparts in other, such as neighbouring measurement(s), whereby it may be deleted as a candidate.

In this context, the predetermined amount or uncertainty within which a candidate should be may be a fixed amount, a fixed percentage or a measure depending on e.g. an overall signal-to-noise ratio determined.

A fourth aspect of the invention relates to a system for estimating a rotational velocity or spin frequency of a rotating sports ball in flight, the system comprising:
1. a receiver adapted to, a number of points in time during the flight, receive electromagnetic waves reflected from the rotating sports ball and provide a corresponding signal,
2. means for performing a frequency analysis of the signal, and identifying one, two or more discrete spectrum traces positioned at least substantially equidistantly in frequency and being continuous over time, and
3. means for estimating the velocity/frequency from a frequency distance between the discrete spectrum traces.

Naturally, the comments relating to the third aspect again are relevant.

Thus, the means 2. may be adapted to identify, subsequent to the frequency analysis, a first frequency corresponding to a velocity of the ball in a direction toward or away from the receiver and to identify, as the spectrum traces, spectrum traces positioned symmetrically around the first frequency.

A preferred manner of determining the velocity/frequency is one, wherein the means 2. are adapted to, for each point in time and sequentially in time:
  perform the frequency analysis and the identification of equidistant candidate frequencies for a point in time,
  subsequently identify those candidates which have a frequency deviating at the most a predetermined amount from a frequency of a candidate of one or more previous points in time,
  then identify, as the frequency traces, traces of identified candidates,
and where the means 3 are adapted to estimate the velocity/frequency on the basis of the identified spectrum lines.

A fifth aspect relates to a method of estimating a spin, comprising a spin axis and a spin frequency, of a sports ball while in flight, the method comprising estimating the spin axis as in the first aspect of the invention and estimating the spin frequency according to the third aspect.

A sixth and final aspect of the invention relates to a system for estimating a spin, comprising a spin axis and a spin frequency, of a sports ball while in flight, the system comprising the system according to the second aspect of the invention, for determining the spin axis, and the system according to the fourth aspect for determining the spin frequency.

In the following, a preferred embodiment of the invention will be described with reference to the drawing, wherein.

Using a Doppler radar to measure the spin frequency of sports balls has been known for years; see U.S. Pat. No. 6,244,971 and US 2002/0107078 A1. However, all these inventions are based on modifying the reflection off some area of the ball, typically by adding conducting material either under or on the cover of the ball. The present embodiment also uses a Doppler radar, but does not require any modifications to the ball in order to extract the spin frequency. This aspect increases the commercial value of the present invention significantly.

In the past, the orientation of the spin axis of a rotating ball has been measured by using cameras placed close to the launching area. These systems only provide the orientation of the spin axis in one point in space, right after launch. The present invention uses a 3 dimensional trajectory measuring equipment to measure the spin axis orientation during flight.

The present invention makes it possible to have a continuous measurement of the spin frequency and spin axis orientation during the entire flight of the ball.

Spin Frequency

Figure 1:
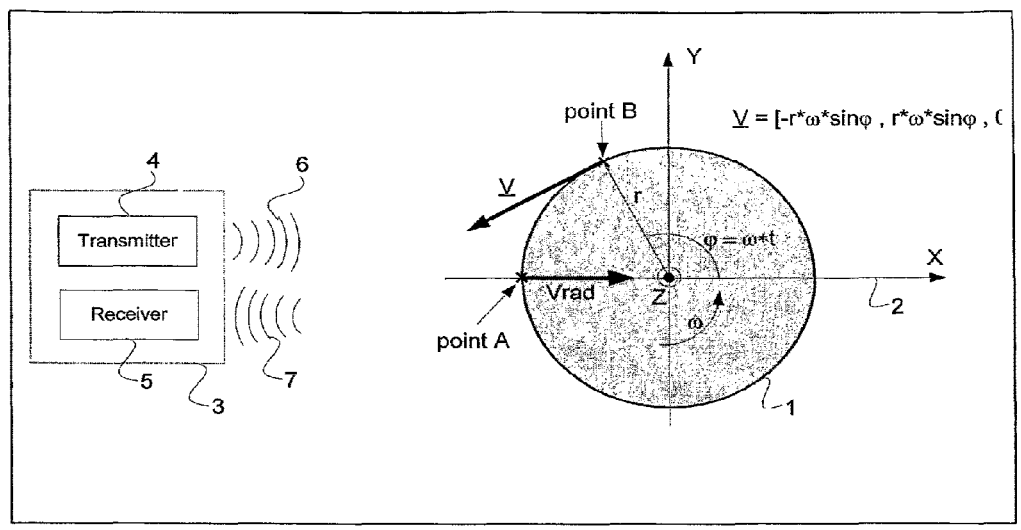
FIG. 1 is a schematic illustration of a rotating ball and a Doppler radar.

Consider a Doppler radar 3 in FIG. 1. The Doppler radar comprises a transmitter 4 and a receiver 5. The transmitting wave 6 at frequency Ftx is reflected on the ball 1, the reflected wave 7 from the ball 1 has a different frequency Frx. The difference between the reflected frequency and the transmitted frequency, is called the Doppler shift $F_{dopp}$. $F_{dopp}$ is proportional to the relative speed Vrad of the reflecting point A on the ball 1 relative to the radar 3.

$$F_{dopp,A} = 2/\lambda * V\text{rad} \quad [1],$$

where is the wavelength of the transmitting frequency.

A coordinate system 2 is defined as having origin in the center of the ball and X-axis always pointing directly away from the radar, the Z-axis is in the horizontal plane.

Vrad is the change in range from the Doppler radar 3 relative to time (Vrad=dR/dt). With the coordinate system 2 in FIG. 1, Vrad equals the X component of the velocity of the ball 1.

The strongest reflection from the ball 1 will always be the point A which is perpendicular to the line-of-sight from the radar. When the ball 1 is spinning, the point A with the strongest reflection will in fact be different physical locations on the ball over time.

The output signal of the Doppler receiver 5 from the reflection of point A on the ball can be written as:

$$x_A(t) = a(t) * \exp(-j * F_{dopp,A} * t) \quad [2],$$

where a(t) is the amplitude of the received signal.

Consider now the situation of a spinning ball 1 with an angular velocity of ω of the ball around the Z-axis. The reflection from a fixed point B on the ball 1, with a radius of r, will have a Doppler shift relative to the radar 1 of:

$$F_{dopp,B} = 2/\lambda * (V\text{rad} - r * \omega * \sin(\omega * t)) \quad [3]$$

The output signal of the receiver 5 from the reflection of point B on the ball can be written as:

$$x_B(t) = a(t) * d(t) * \exp(-j * F_{dopp,B} * t) \quad [4],$$

where d(t) is the relative amplitude of the received signal from point B relative to point A on the ball 1.

By substituting [2] and [3] in [4], one gets:

$$x_B(t) = x_A(t) * d(t) * \exp(j * 2/\lambda * r * \omega * \sin(\omega * t) * t) \quad [5]$$

It is seen that the output signal from point B consist of the signal from point A modulated by a signal $x_{modB}(t)$:

$$x_{modB}(t) = d(t) * \exp(j * 2/\lambda * r * \omega * \sin(\omega * t) * t) \quad [6]$$

The exponential term of the modulating signal, is recognized as a frequency modulation (FM) signal, with a modulation frequency of ω/2π and a frequency deviation of 2/λ*r*ω.

From modulation theory it is well known that the spectrum of a sinusoid frequency modulation gives a spectrum with discrete frequency lines at the modulation frequency ω/2π and harmonics of this, the power of the spectrum lines of the m'th harmonic are equal to $J_m(4\pi*r/\lambda)$, where $J_m()$ is the Bessel function of first kind of m'th order.

The amplitude signal d(t) of the modulating signal in [6], will also have a time dependent variation. d(t) will like the exponential term in [6] also be periodic with the period T=2π/ω. Consequently will the spectrum from d(t) also have discrete spectrum lines equally spaced ω/2π. The relative strength of the individual harmonics of d(t) will depend on the reflection characteristics for the different aspect angles.

In summary, because of reflection from a physical point B on a spinning ball from other positions than when this point is closest to the radar (at point A), the received signal will have equally spaced sidebands symmetrical around the Doppler shift $F_{dopp,A}$, caused by the velocity of the ball. The sidebands will have multiple harmonics and will be spaced exactly the spin frequency of the ball ω/2π. Only in the case of a perfect spherical ball, there will be no modulation sidebands.

On a normal sports ball there will be several areas on the ball that is not perfectly spherical. Each of these points will give discrete sidebands spaced the spin frequency. The total spectrum for all the scatters on the ball will then add up to the resulting received signal, that of course also has discrete sidebands spaced the spin frequency.

In the above the spin axis was assumed to be constant during time and parallel with the Z-axis. If the spin axis is rotated α around the Y-axis and then rotated β around the X-axis, it can easily be shown that the x-component of the velocity of point B equals:

$$Vx, B = \cos \alpha * r * \omega * \sin(\omega * t) \quad [7]$$

Note that Vx,B is independent of the rotation β around the X-axis. Since Vx,B also is periodic with the period T=2π/ω, except for the special case of spin axis along the X-axis (α=90 deg), the corresponding Doppler shift from point B with rotated spin axis will also have discrete sidebands spaced exactly the spin frequency of the ball ω/2π. This means as long as the spin axis orientation changes slowly compared to the spin frequency, the spectrum of the received signal will contain discrete frequency sidebands spaced the spin frequency of the ball ω/2π.

Figure 2:
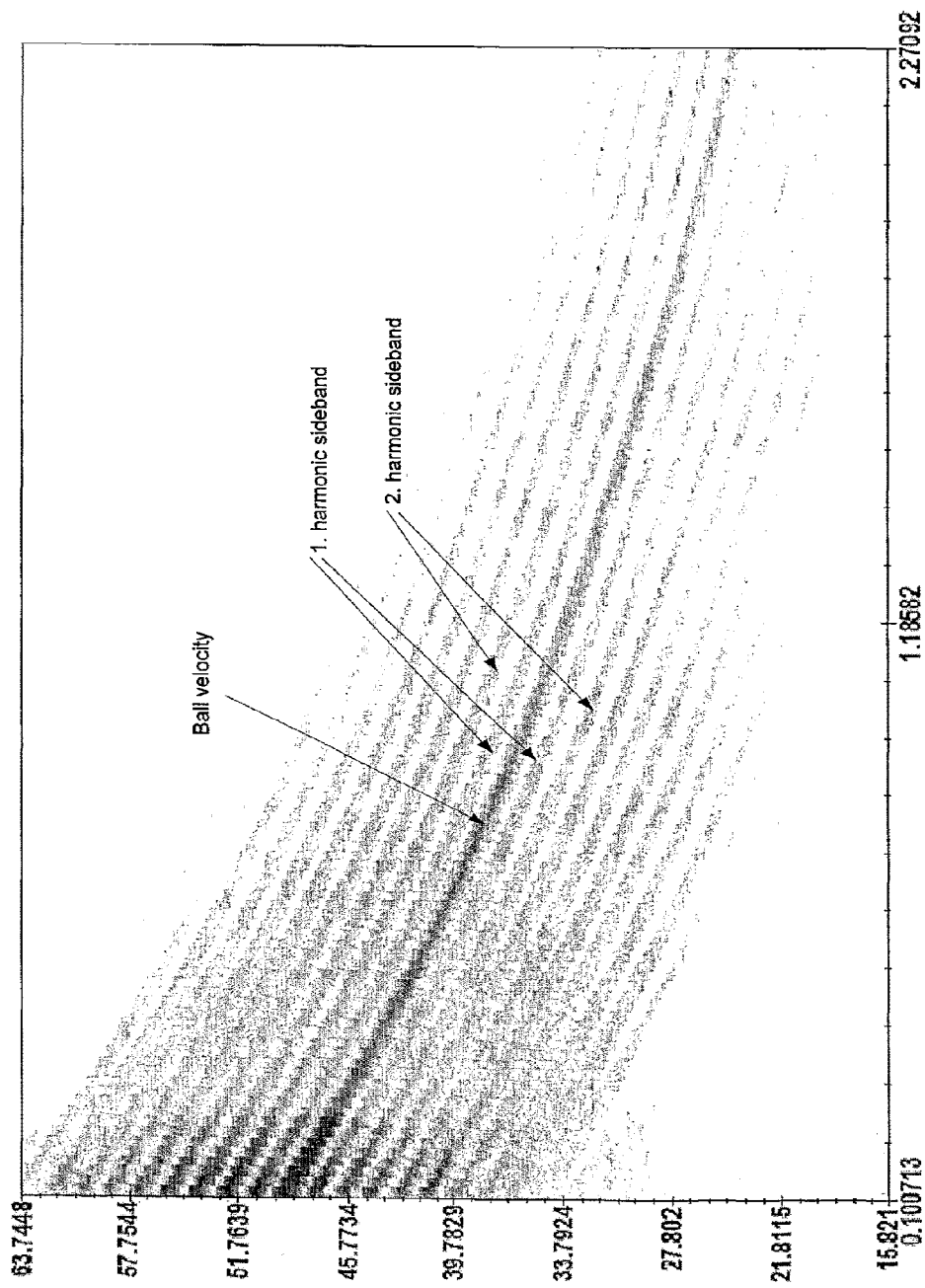
FIG. 2 illustrates a spectrum having equidistant spectrum lines.

In FIG. 2 the received signal spectrum of a golf ball in flight is shown. In FIG. 2 it is clearly seen that the spectrum contains a strong frequency line that corresponds to the velocity of the ball, as well as symmetric sidebands around this velocity that are equally spaced with the spin frequency.

Figure 3:
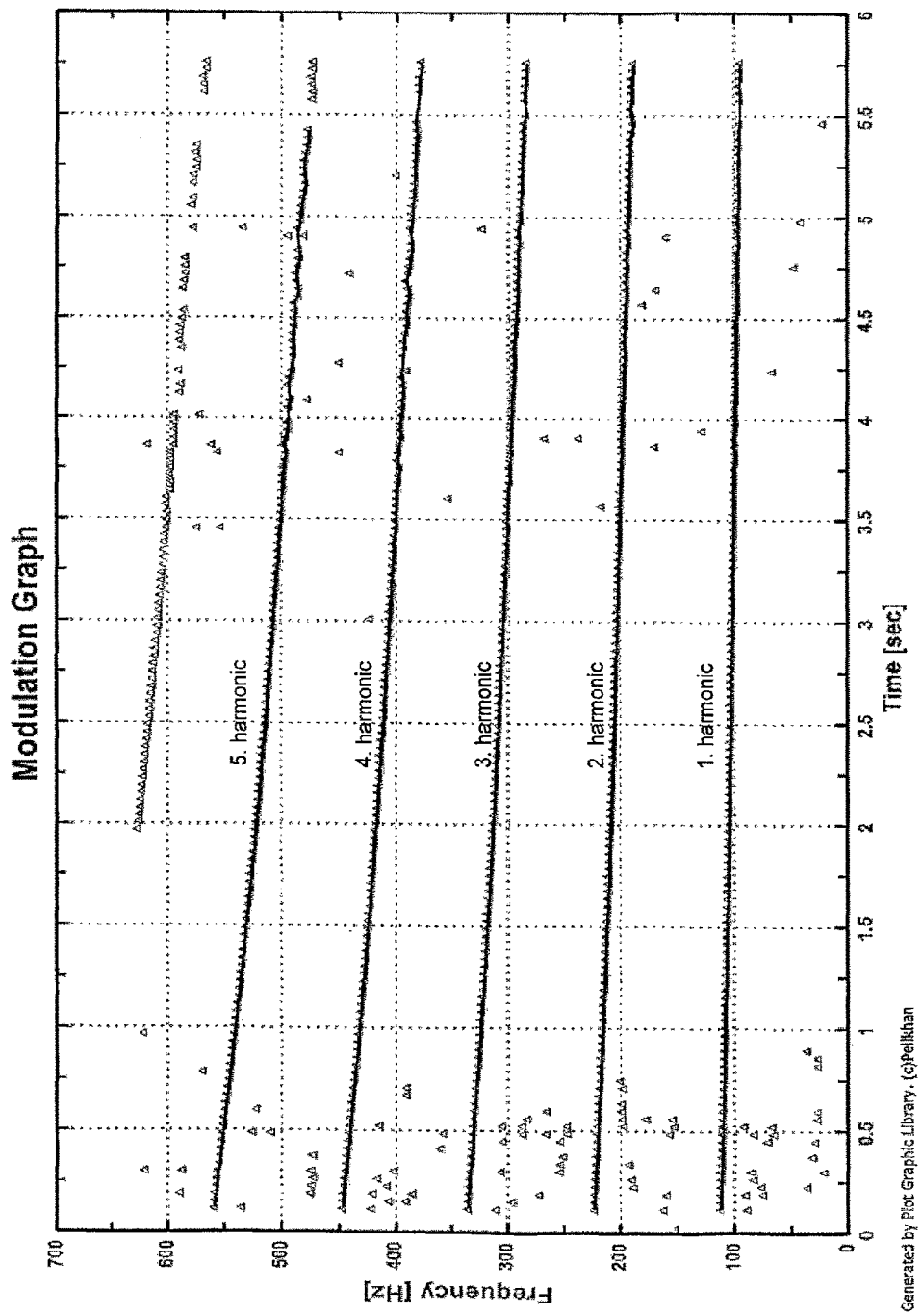
FIG. 3 illustrates the determination of equidistant spectrum lines.

First the ball velocity is tracked 8 using standard tracking methods. Then symmetrical frequency peaks around the ball velocity is detected 9. In FIG. 3 the frequency offset of the symmetrical sidebands are shown relative to the ball velocity. The different harmonics of the spin sidebands are tracked over time using standard tracking methods 10. The different tracks are qualified 11, requiring the different harmonic tracks to be equally spaced in frequency. The different tracks are solved for their corresponding harmonic number 12. After this, the spin frequency can be determined from any of the qualified harmonic tracks 13, provided that the frequency is divided by the respective harmonic number.

Figure 5:
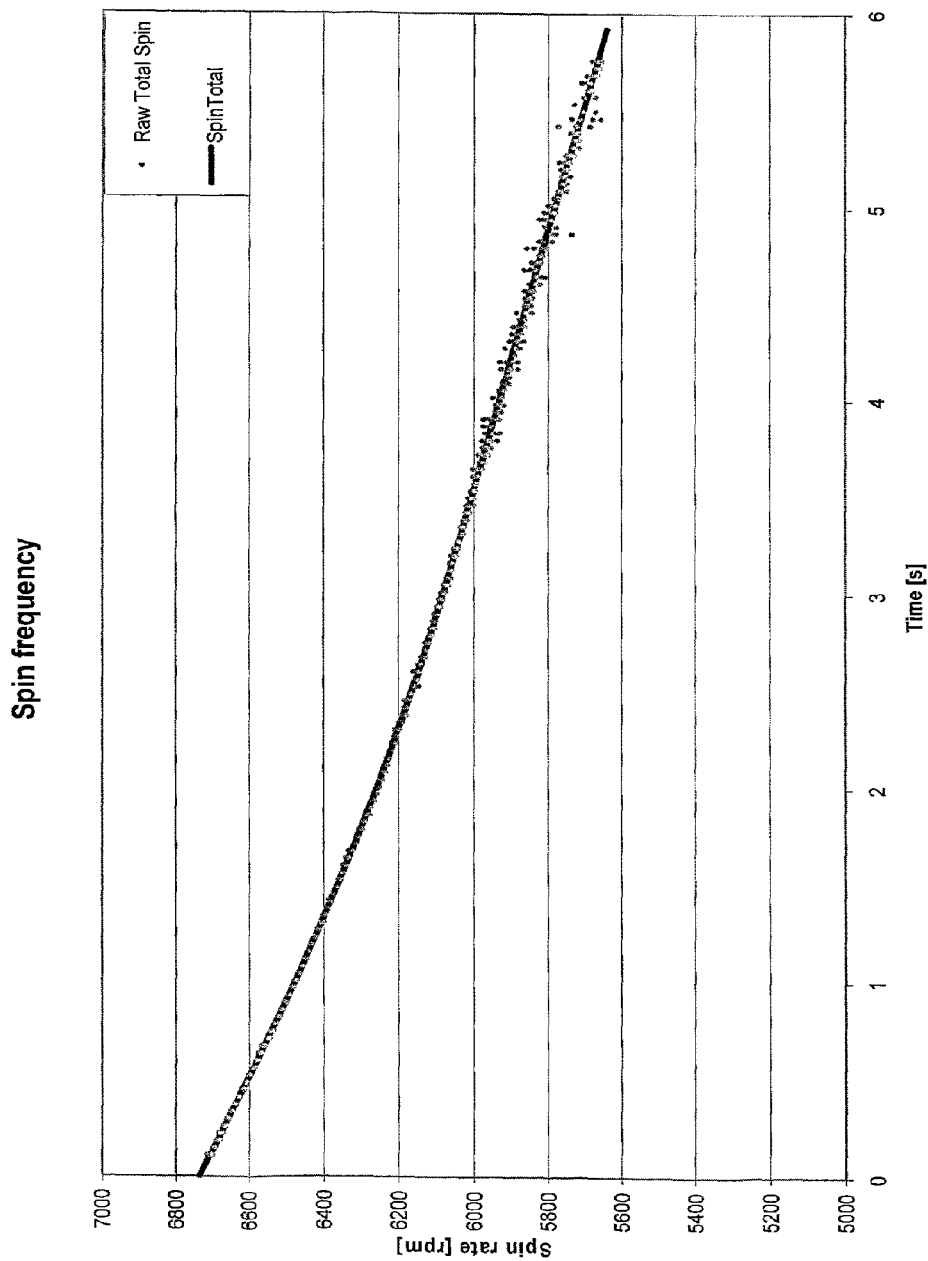
FIG. 5 illustrates the final spin frequency chart over time.
Figure 6:
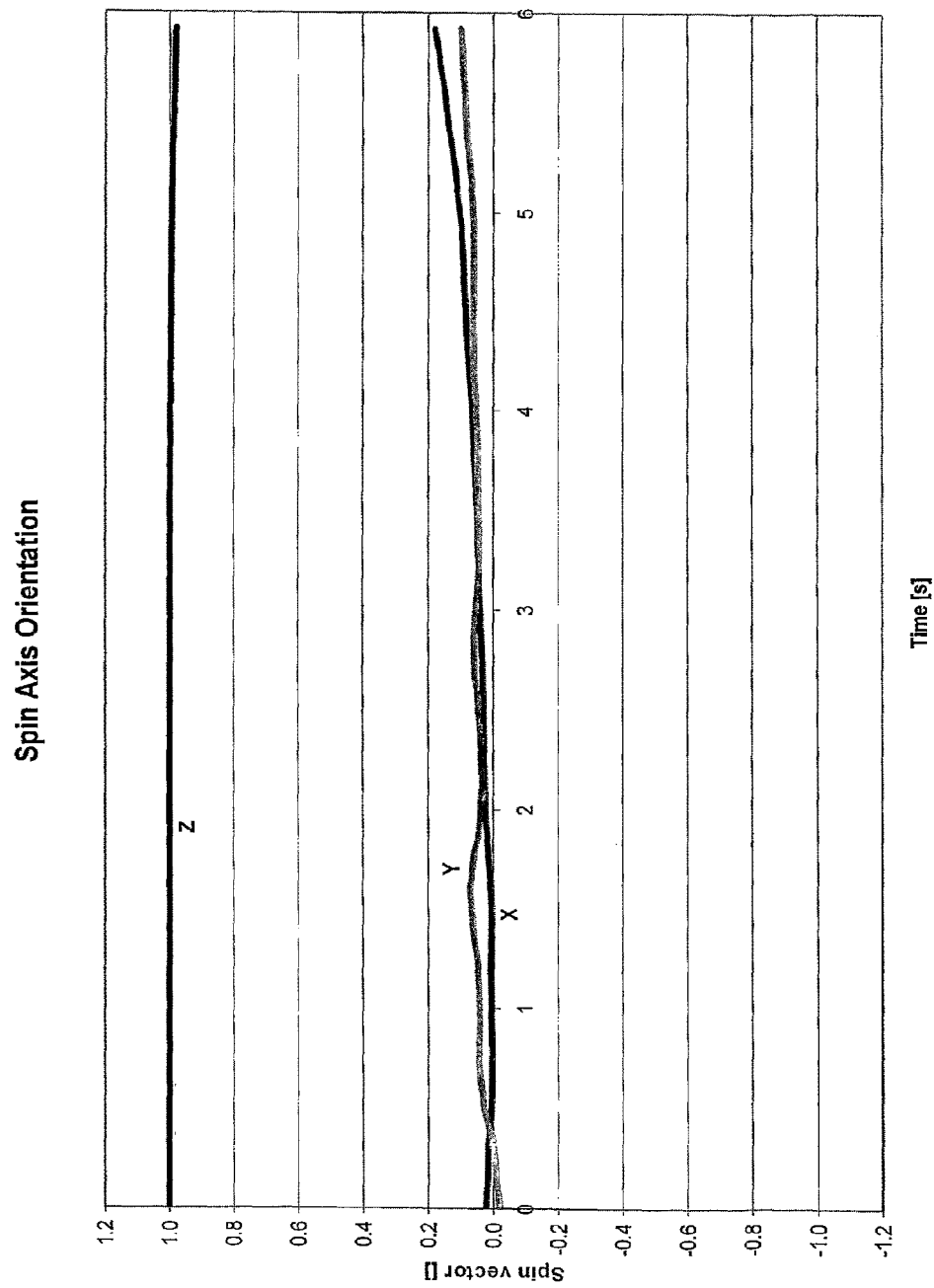
FIG. 6 illustrates a spin vector relating to the trajectory of FIG. 4.

The final spin frequency chart over time is shown in FIG. 5, which contains all of the harmonic tracks.

Figure 7:
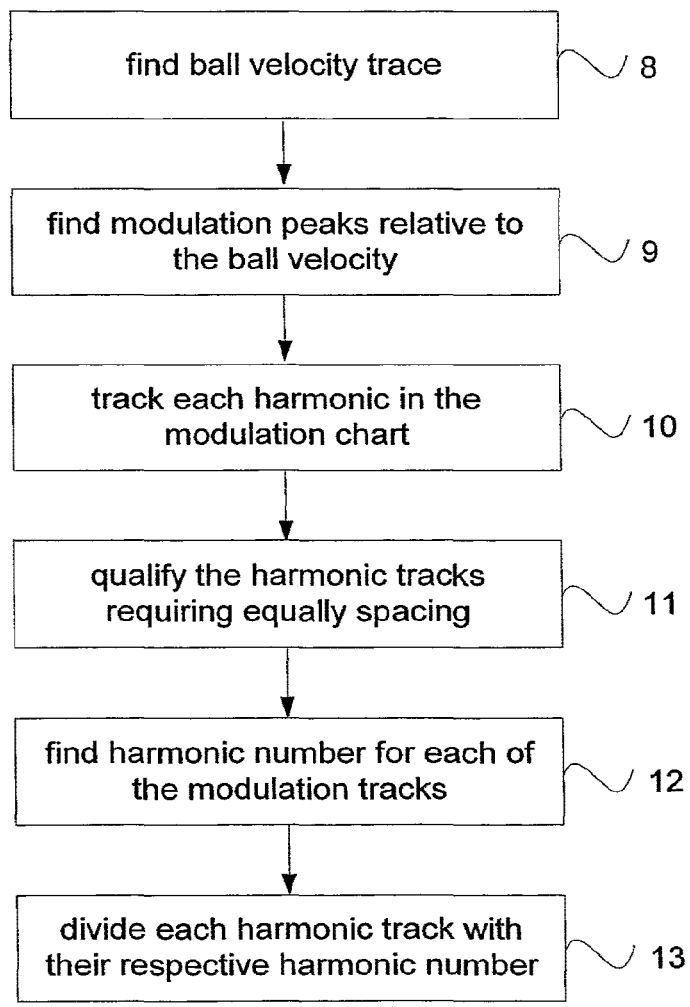
FIG. 7 is a flow chart over the detection of spin frequency.

The step-by-step procedure for measuring the spin frequency is described in FIG. 7.

Spin Axis Orientation

Figure 4:
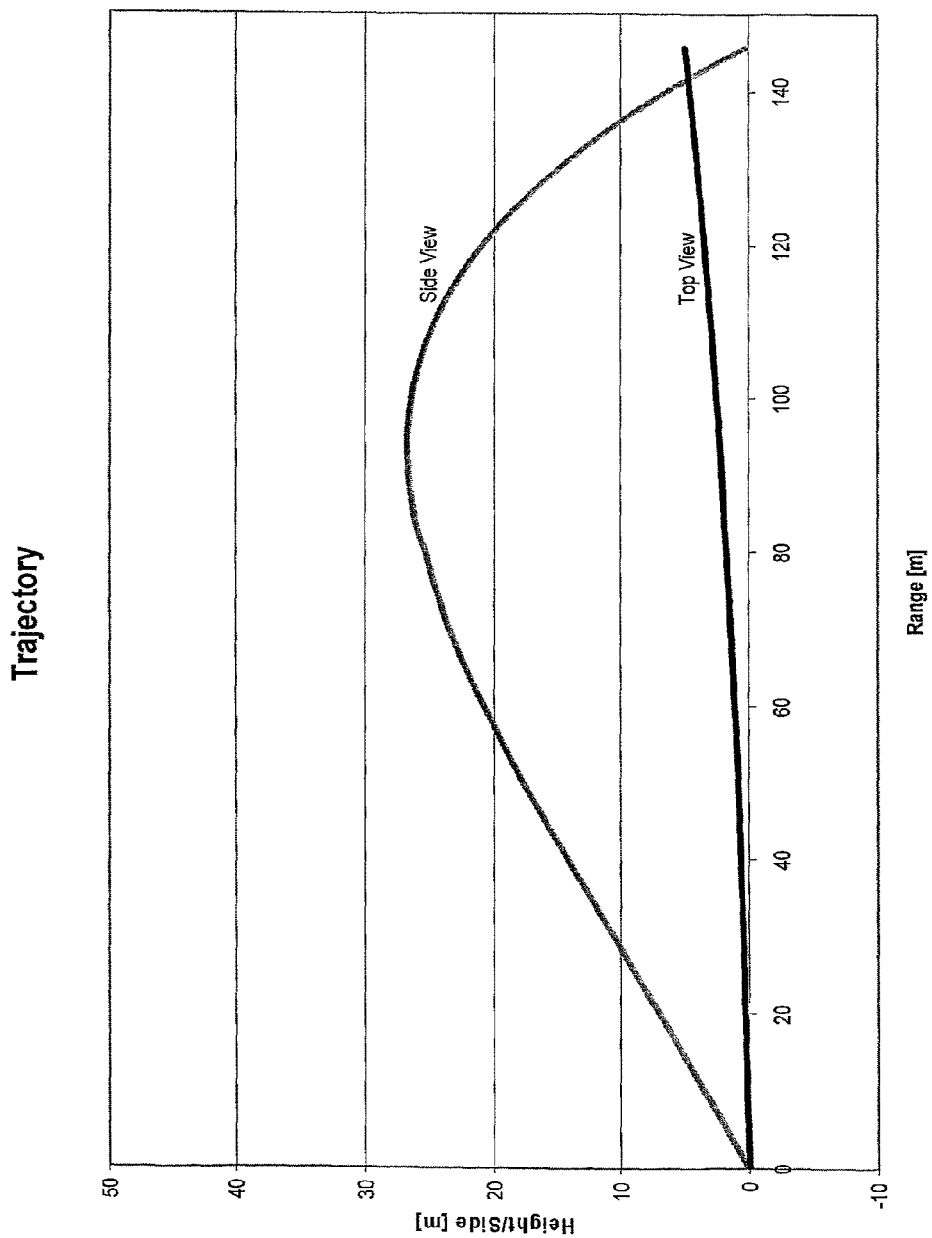
FIG. 4 illustrates a measured 3D trajectory of a golf ball.

The 3 dimensional trajectory of the ball flight is obtained by appropriate instruments. In the preferred embodiment of the present invention, the radar used for measuring the spin frequency is also used to provide a 3 dimensional trajectory of the ball flight, see FIG. 4.

Figure 8:
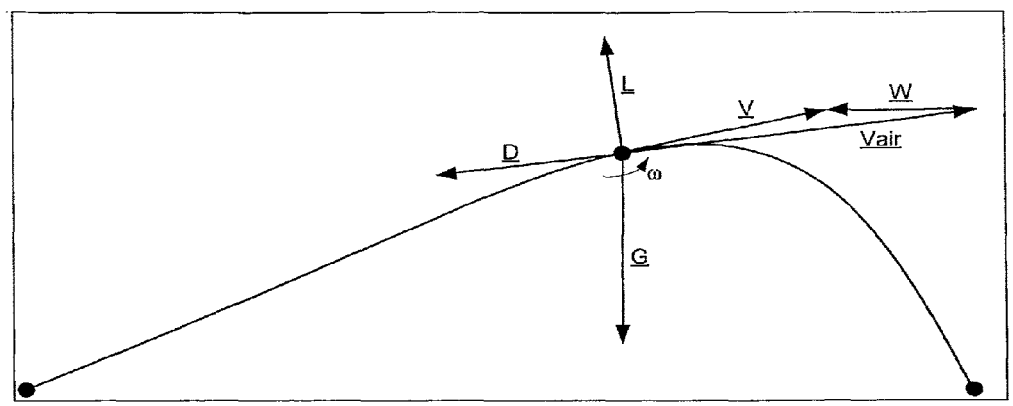
FIG. 8 illustrates the determination of the orientation of the spin vector.

Assuming that the ball is spherical rotational symmetric to a high degree, their will be three and only three forces acting on the ball. Referring to FIG. 8, the accelerations will be:

gravity acceleration, G air resistance/drag acceleration, D and lift acceleration, L The total acceleration acting on a flying ball is consequently:

$$A = G + D + L \quad [8]$$

Examples of balls that satisfy the rotational symmetry criteria are: golf balls, tennis balls, base balls, cricket balls, soccer balls etc.

The drag is always 180 deg relative to the airspeed vector Vair. The lift acceleration L is caused by the spinning of the ball and is always in the direction given by ωxVair (x means vector cross product), i.e. 90 deg relative to the spin vector ω and 90 deg relative to the airspeed vector Vair. The spin vector ω describes the orientation of the spin axis, identified with the spin unity vector ωe, and the magnitude of the spin vector ω is the spin frequency co found through the algorithm described in FIG. 7.

The airspeed vector is related to the trajectory velocity vector V by:

$$V\text{air} = V - W \quad [9]$$

Figure 9:
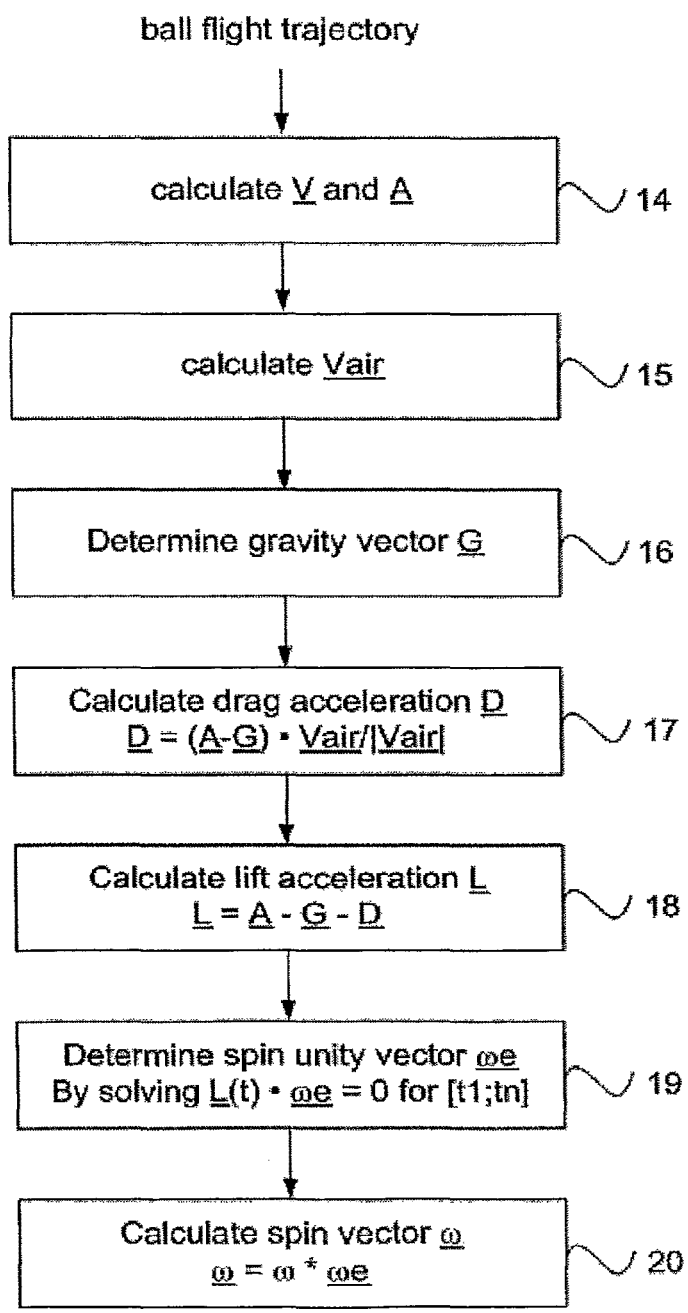
FIG. 9 is a flow chart of the determination of the orientation of the spin vector.

The procedure for calculating the orientation of the spin vector ω is described in FIG. 9.

From the measured 3 dimensional trajectory, the trajectory velocity V and acceleration A are calculated by differentiation 14.

The airspeed velocity is calculated 15 using equation [9], using a priori knowledge about the wind speed vector W.

The gravity acceleration G is calculated 16 from a priori knowledge about latitude and altitude.

Since drag and lift acceleration are perpendicular to each other, the magnitude and orientation of the drag acceleration D can be calculated 17 using equation [10].

$$D = [(A-G) \cdot V\text{air}/|V\text{air}|^2] * V\text{air} \quad [10],$$

where · means vector dot product.

Hereafter the magnitude and orientation of the lift acceleration L can be easily found 18 from [11].

$$L = A - G - D \quad [11]$$

As mentioned earlier, by definition the lift vector L is perpendicular to the spin vector ω meaning that:

$$L \cdot \omega e = 0 \quad [12]$$

The spin unity vector ωe is normally assumed to be constant over time for rotational symmetrical objects due to the gyroscopic effect. If the spin unity vector ωe can be assumed to be constant over a time interval [t1;tn], then equation [12] constructs a set of linear equations [13].

$$\begin{aligned} Lx(t1)*\omega ex + Ly(t1)*\omega ey + Lz(t1)*\omega ez &= 0 \\ Lx(t2)*\omega ex + Ly(t2)*\omega ey + Lz(t2)*\omega ez &= 1 \\ | \quad\quad\quad | \quad\quad\quad | &= | \\ Lx(tn)*\omega ex + Ly(tn)*\omega ey + Lz(tn)*\omega ez &= 0 \end{aligned} \quad [13]$$

where
$L(t) = [Lx(t), Ly(t), Lz(t)]$
and
$\underline{\omega e} = [\omega ex, \omega ey, \omega ez]$ The linear equations in [13] can be solved for [ωex, ωey, ωez] by many standard mathematical methods. Hereby the 3 dimensional orientation of the spin axis in the time interval [t1,tn] can be determined. The only assumption is that the spin axis is quasi constant compared to the variation of the direction of the lift vector L.

By combining the spin frequency ω found from the algorithm described in FIG. 7 with the spin unity vector ωe found from equation [13], the spin vector ω can be found 20 by using equation [14].

$$\omega = \omega * \omega e \quad [14]$$

Partwise Known Orientation of Spin Axis

In many cases it is known a priori that the spin axis lies in a known plane at a certain point in time. Let this plane be characterized by a normal unity vector n. This means:

$$n \cdot \omega = 0 \quad [15]$$

An example of such a case is the spin axis orientation right after launch of ball. When a ball is put into movement by means of a collision, like a golf ball struck by a golf club or a soccer ball hit by a foot, the spin vector ω will right after launch to a very high degree be perpendicular to the initial ball velocity vector V. The normal unity vector n in [15] will in this case be given by equation [16].

$$n = V/|V| \quad [16]$$

Figure 10:
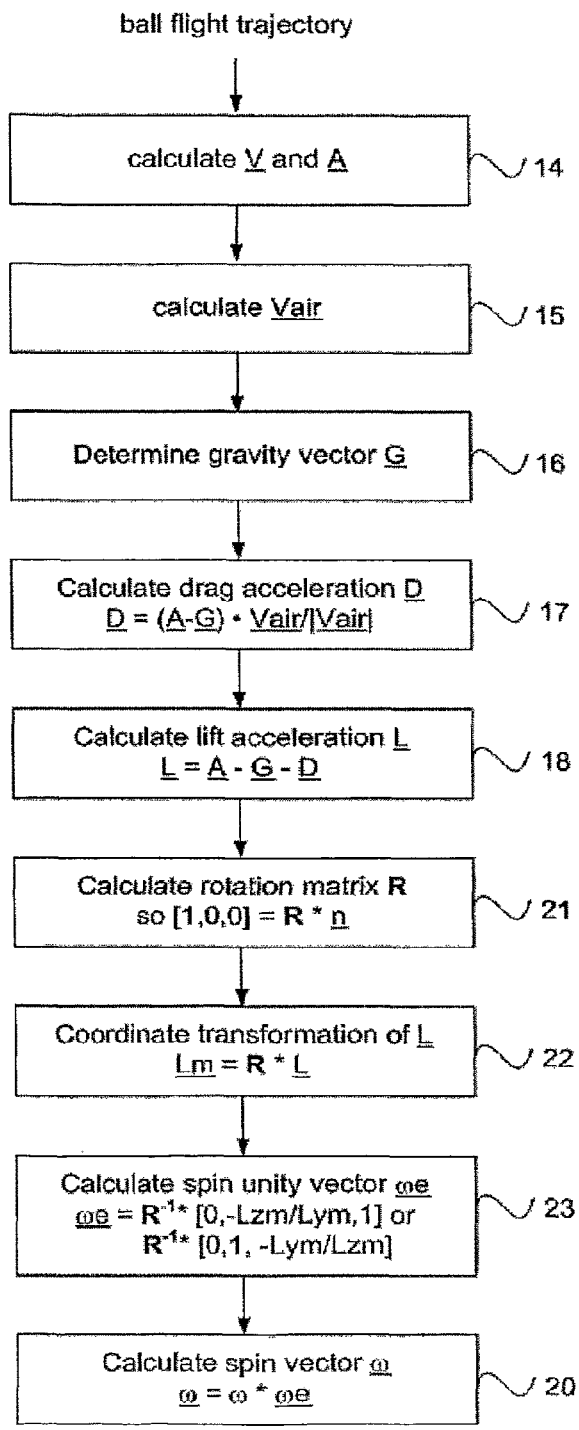
FIG. 10 is a flow chart of the determination of the orientation of the spin vector when it can be assumed that the spin axis lays in a known plane.

The procedure for calculating the orientation of the spin vector ω in the point in time t0 where the spin vector lays in a known plane characterized by the normal unity vector n is described in FIG. 10.

First following the exact same steps 14-18 as described in FIG. 9 to obtain the lift acceleration at the time t0.

Now determine 21 a rotation matrix R that converts the coordinates for the normal unity vector n in the base coordinate system to the x-axis unity vector [1,0,0], see equation [17]. The rotation matrix R can be found by standard algebraic methods from n.

$$[1,0,0] = R * n \quad [17]$$

The coordinates for the lift acceleration L from equation [11] is now rotated 22 through R represented by the Lm vector, see equation [18].

$$Lm = [Lxm, Lym, Lzm] = R * L \quad [18]$$

Similar coordinate transformation for the spin unity vector ωe, see equation [19].

$$\omega em = [\omega exm, \omega eym, \omega ezm] = R * \omega e \quad [19]$$

Since it known from equation [15] that ωexm equals 0, then equation [13] simplifies to equation [20].

$$Lym * \omega eym + Lzm * \omega ezm = 0 \quad [20]$$

By using that the length of ωem equals 1, the spin unity vector ωe can be found 23 from either equation [21] or [22].

$$\omega e = R^{-1} * [0, -Lzm/Lym, 1]/|[0, -Lzm/Lym, 1]|, Lym \neq 0 \quad [21]$$

$$\omega e = R^{-1} * [0, 1, -Lym/Lzm]/|[0, 1, -Lym/Lzm]|, Lzm \neq 0 \quad [22]$$

By combining the spin frequency ω found from the algorithm described in FIG. 7 with the spin unity vector ωe found from equation [21]-[22], the spin vector ω can be found 20 by using equation [14].

I claim:

1. A method of estimating a spin frequency of an unmarked rotating sports ball in flight, the method comprising:
   receiving, using a receiver of a radar arrangement, electromagnetic waves reflected from the unmarked rotating sports ball;
   deriving from said received electromagnetic waves, via the radar arrangement, a signal having a first frequency corresponding to a velocity of the unmarked rotating sports ball, the signal being amplitude modulated by a modulation frequency; and
   estimating, via the radar arrangement, at at least a single point in time, the spin frequency of the unmarked rotating sports ball based on at least one frequency distance between a harmonic of the modulation frequency and one or more of: in a first case, the first frequency and, in a second case, an additional harmonic of the modulation frequency.

2. The method of claim 1, wherein the spin frequency is determined by dividing the frequency distance by a harmonic number of the harmonic in the first case or a difference in harmonic number of the harmonics in the second case.

3. The method of claim 1, wherein the deriving step includes performing a frequency analysis of the signal.

4. The method of claim 3, wherein the step of performing the frequency analysis comprises detecting a plurality of harmonics.

5. The method of claim 1, wherein said harmonic and said additional harmonic comprise harmonics symmetric about the first frequency.

6. The method of claim 1, wherein said first harmonic and said additional harmonic comprise two adjacent harmonics.

7. The method of claim 1, wherein the spin frequency of the rotating sports ball is estimated based on the at least one frequency distance between the first frequency and each of said harmonic and said additional harmonic.

8. The method of claim 1, wherein the first frequency corresponds to the velocity of the rotating sports ball in a direction toward or away from the receiver.

9. The method of claim 1, wherein said estimating step is repeated at at least one additional point in time during the flight of the rotating sports ball.

10. The method of claim 3, wherein the step of performing a frequency analysis comprises: identifying the first frequency as a 0th harmonic, the first frequency corresponding to the velocity of the rotating sports ball in a direction toward or away from the receiver, tracking a plurality of harmonics of the modulation frequency of said signal over time, qualifying the tracked plurality of harmonics by requiring that the tracked plurality of harmonics are equally spaced in frequency, and solving the qualified harmonics for their corresponding harmonic number, wherein the step of estimating comprises estimating, at at least one point in time, the spin frequency from two of the qualified harmonics by dividing the frequency distance by a difference between respective corresponding harmonic numbers of said two qualified harmonics.

11. A system for estimating a spin frequency of an unmarked rotating sports ball in flight, the system comprising:
a receiver of a radar arrangement configured to, at at least a single point in time, receive electromagnetic waves reflected from the unmarked rotating sports ball and provide a corresponding signal, which is amplitude modulated by a modulation frequency, wherein the radar arrangement is configured to perform a frequency analysis of the amplitude modulated signal and detect at least one harmonic of the modulation frequency, the radar arrangement being further configured to estimate the spin frequency from a frequency distance between said at least one harmonic and one or more of: in a first case, a first frequency corresponding to a velocity of the unmarked rotating sports ball and, in a second case, an additional harmonic of the modulation frequency.

12. The system of claim 11, wherein the spin frequency is determined by dividing the frequency distance by a harmonic number of the harmonic in the first case or a difference in harmonic number of the harmonics in the second case.

13. The system of claim 11, wherein the radar arrangement is further configured to identify, subsequent to the frequency analysis, the first frequency as a 0th harmonic, the first frequency corresponding to the velocity of the rotating sports ball in a direction toward or away from the receiver, track a plurality of harmonics of the modulation frequency of said signal over time, qualify the tracked plurality of harmonics by requiring that the tracked plurality of harmonics are equally spaced in frequency, solve the qualified harmonics for their corresponding harmonic number, and estimate the spin frequency from two of the qualified harmonics by dividing the frequency distance by a difference between respective corresponding harmonic numbers of said two qualified harmonics.

14. The system of claim 11, wherein said at least one harmonic and said additional harmonic comprise two adjacent harmonics.

15. The system of claim 11, wherein said at least one harmonic and said additional harmonic comprise harmonics symmetric about the first frequency.

16. The system of claim 11, wherein the spin frequency of the rotating sports ball is estimated based on the frequency distance between the first frequency and each of said at least one harmonic and said additional harmonic.

17. The system of claim 11, wherein the first frequency corresponds to the velocity of the rotating sports ball in a direction toward or away from the receiver.

18. A system for estimating a spin frequency of an unmarked rotating sports ball in flight, the system comprising: a receiver of a radar arrangement; and a computer-readable medium storing instructions which, when executed on the receiver, cause the receiver to perform operations comprising: receiving electromagnetic wave reflected from the unmarked rotating sports ball; deriving, from the electromagnetic waves, a signal having a first frequency corresponding to a velocity of the unmarked rotating sports ball, the signal being amplitude modulated by a modulation frequency; and estimating, at a point in time, the spin frequency of the unmarked rotating sports ball based on a frequency distance between a harmonic of the modulation frequency and one of the first frequency and an additional harmonic of the modulation frequency.

19. The system of claim 18, wherein the spin frequency is determined by dividing the frequency distance by one of a harmonic number of the harmonic and a difference in harmonic number of the harmonics.

20. The system of claim 18, wherein the deriving of the signal further comprises performing a frequency analysis of the signal.

21. A method for estimating a spin frequency of a rotating sports ball in flight, comprising:
receiving, using a receiver of a radar arrangement, electromagnetic waves reflected from the rotating sports ball;
deriving, without regard to any marking on the rotating sports ball, from said received electromagnetic waves, via the radar arrangement, a signal having a first frequency corresponding to a velocity of the rotating sports ball, the signal being amplitude modulated by a modulation frequency; and
estimating, without regard to any marking on the rotating sports ball, via the radar arrangement, at at least a single point in time, the spin frequency of the rotating sports ball based on at least one frequency distance between a harmonic of the modulation frequency and one of the first frequency and an additional harmonic of the modulation frequency.

22. The method of claim 21, wherein the spin frequency is determined by dividing the frequency distance by one a harmonic number of the harmonic and a difference in harmonic number of the harmonics.

23. The method of claim 21, further comprising the step of performing a frequency analysis comprising detecting a plurality of harmonics disposed symmetrically about the first frequency.

24. The method of claim 21, wherein the spin frequency of the rotating sports ball is estimated based on the at least one frequency distance between the first frequency and each of said harmonic and said additional harmonic.

25. A system for estimating a spin frequency of a rotating sports ball in flight, comprising:
a receiver of a radar arrangement configured to, at at least a single point in time, receive electromagnetic waves reflected from the rotating sports ball and provide a corresponding signal, which is amplitude modulated by a modulation frequency, wherein the radar arrangement is configured to perform, without regard to any marking on the rotating sports ball, a frequency analysis of the modulated signal and detect at least one harmonic of the modulation frequency, the radar arrangement being further configured to estimate, without regard to any marking on the rotating sports ball, the spin frequency from a frequency distance between said at least one harmonic and one of a first frequency corresponding to a velocity of the rotating sports ball and an additional harmonic of the modulation frequency.

26. The system of claim 25, wherein the spin frequency is determined by dividing the frequency distance by one of a harmonic number of the harmonic and a difference in harmonic number of the harmonics.

27. The system of claim 25, wherein the radar arrangement is further configured to identify, subsequent to the frequency analysis, the first frequency as a 0th harmonic, the first frequency corresponding to the velocity of the rotating sports ball in a direction toward or away from the receiver, track a plurality of harmonics of the modulation frequency of said signal over time, qualify the tracked plurality of harmonics by requiring that the tracked plurality of harmonics are equally spaced in frequency, solve the qualified harmonics for their corresponding harmonic number, and estimate the spin frequency from two of the qualified harmonics by dividing the frequency distance by a difference between respective corresponding harmonic numbers of said two qualified harmonics.

* * * * *

UNITED STATES PATENT AND TRADEMARK OFFICE
CERTIFICATE OF CORRECTION

PATENT NO.         : 9,645,235 B2                                        Page 1 of 1
APPLICATION NO.    : 14/478666
DATED              : May 9, 2017
INVENTOR(S)        : Tuxen It is certified that error appears in the above-identified patent and that said Letters Patent is hereby corrected as shown below:

In the Claims

Claim 18, Column 10, Line 31:
"comprising: receiving electromagnetic wave reflected from" should read "comprising: receiving electromagnetic waves reflected from"

Claim 22, Column 10, Line 67:
"is determined by dividing the frequency distance by one a" should read "is determined by dividing the frequency distance by one of a"

Signed and Sealed this
Nineteenth Day of June, 2018

Andrei Iancu
*Director of the United States Patent and Trademark Office*